United States Patent [19]
Osterhoudt, III

[11] Patent Number: 5,515,924
[45] Date of Patent: May 14, 1996

[54] TECHNIQUE FOR RESTORING OR INCREASING FLOW TO OIL AND GAS WELLS

[76] Inventor: M. Glenn Osterhoudt, III, P.O. Box 202082, Arlinton, Tex. 76006

[21] Appl. No.: 326,032

[22] Filed: Oct. 19, 1994

[51] Int. Cl.⁶ .................................................. E21B 43/00
[52] U.S. Cl. ........................... 166/309; 166/311; 166/63
[58] Field of Search ............................ 166/63, 309, 311, 166/300

[56] References Cited

U.S. PATENT DOCUMENTS

| | | | |
|---|---|---|---|
| 2,168,116 | 8/1939 | Crites et al. | 166/309 |
| 3,164,206 | 1/1965 | Sharp | 166/300 |
| 3,422,760 | 1/1969 | Mohaupt | 166/63 |
| 3,593,800 | 7/1971 | Hutchison | 166/312 |
| 3,726,340 | 4/1973 | Fraser | 166/117 |
| 4,276,934 | 7/1981 | Fraser | 166/286 |
| 5,005,641 | 4/1991 | Mohaupt | 166/63 |
| 5,083,615 | 1/1992 | McLaughlin et al. | 166/63 X |

*Primary Examiner*—Frank S. Tsay
*Attorney, Agent, or Firm*—M. Glenn Osterhoudt

[57] ABSTRACT

A well, such as an oil or gas well, may be revived and or increase the flow of hydrocarbons from the well, by inserting a surfactant/chemical solution in solid stick form into the wellbore through the wellhead. The soap stick falls down the production tubing or casing due to gravitational pull and upon contacting the undesired well fluid(s) instantly reacts with the fluids to transform the fluids into foam, thus lightening the hydrostatic pressure being applied to the producing formation and increasing the flow of hydrocarbons. The sticks are manufactured by melting solid surfactants and or foamers to liquid form, then mixing the hydrogen gas producing chemicals and or acid solutions uniformly in the molten surfactants and or roamers, then pouring the molten mixture into various sized containers. When the mixture cools, it returns to solid form ready for use. The surfactant(s) are low moisture content foamers, the chemical(s) are hydrogen gas producing compounds which react violently with the downhole fluids. The chemical reaction when the stick contacts downhole fluids provides the agitation necessary to transform the surfactant/foamer compound(s) and the column of fluid into foam, thus reducing the hydrostatic pressure on the producing formation, therefore increasing the flow from the oil and or gas well.

7 Claims, 1 Drawing Sheet

TECHNIQUE FOR RESTORING OR INCREASING FLOW TO OIL AND GAS WELLS

TECHNICAL FIELD OF INVENTION

This invention relates to a new technique and product(s) designed to re-initiate flow and commercial production in oil and gas wells which have ceased the ability to produce hydrocarbons due to a standing column of fluid in the production robing exerting excessive pressure on the production formation.

BACKGROUND OF INVENTION

In the normal life of a commercially viable oil or gas well it is customary for the well to produce water in conjunction with the desired hydrocarbons or combination thereof. In the early stages of the life of said wells the flowing pressures are sufficient to carry the undesired water through the wellbore and out of the well to be separated from the hydrocarbons at the surface. After a period of time, as the subterranean reservoir being produced from begins to be depleted, the pressures of the reservoir decrease and the rate of the hydrocarbons flow in turn decreases. When this occurs the flowing pressure decrease and have an adverse effect on the capacity of the well to carry and remove the undesired water being produced by the well. This is especially true in natural gas wells. When the well cannot carry said water out of the wellbore it builds up in the production tubing in which the well produces the hydrocarbons and literally shuts off flow to the surface. This is commonly known as a dead or drowned well.

In the past, in wells which there has been some production of gas still continuing despite accumulated water or the like, a foaming agent, such as a water-soluble or water and oil soluble surfactant such as soap have been added to the well, both in liquid and in stick form. At present, soap sticks are available in two general types. In the first type, the soap material is a solid and is molded to comprise an elongated rod shaped member which are dropped into the well. The other technique incorporates the use of a water soluble carrier into which the liquid soap material is placed.

These soap sticks travel through ordinary channels of commerce, are bought by the well operator and the gauger drops the sticks into the well. The water in the well dissolves the stick thereby releasing the soap to create foam.

Such products have been found very efficient in lowering the surface tension of the water and are capable of producing large volumes of foam where the well is producing some gas. The gas entering the well will provide the necessary agitation to transform the now soapy column of fluid into foam, thus lightening the standing column weight making it easier for the bottom hole pressure to push this now column of foam upward in the well bore and carry the water contained therein to the surface for disposal by conventional methods. This method has been found very effective in removing water from a well while there is still sufficient gas production (i.e. agitation) to effect such foaming. The method just described will not readily produce flow in a well which has been drowned to such a degree that it is not producing a substantial quantity of gas. Although it may eventually produce enough foam to start the liquid flowing from most such wells, the time element involved is in many instances so great as to make it impractical.

Prior to our novel invention, when a well had reached the point where the agitation provided by the well was insufficient to utilize the aforementioned process the operator dealt with the problem mechanically. These methods include a process known as swabbing, which entails literally bailing the undesired water column from the well bore. A plunger is run down the well on a wire line and the water is physically removed. Other alternatives consist of expensive pumping equipment permanently installed costing literally tens of thousands of dollars. All of these methods require expensive equipment and considerable labor. They also take considerable time. If the right equipment is not available expensive delays result. My new, economical and useful method has the advantage that it does not require bulky or expensive equipment, neither does it require a crew of several men. It can be used rapidly and the necessary materials can be kept in stock since they require a minimum of storage space.

SUMMARY OF INVENTION

In summary, this invention comprises a technique for reviving water drowned oil and or gas wells by way of use of a uniformly, comingled blend of virtually water free surfactants, foamers and gas generating chemical(s) manufactured in a solid, cylindrical shape, to be dropped down the production tubing and upon instant contact with downhole fluids, transform water to foam, thus, lightening the hydrostatic pressure of an unwanted standing column of fluid in the well. Thus, allowing the bottom hole pressure of the well to flow the foam out of the wellbore and return the web to commercial production of the desired hydrocarbons.

Another object of this invention is to provide a method and products to revive and or increase production in said webs in a more economical means to the operators of said webs than is currently available.

Another object of our invention is to remove potentially well killing columns of fluid prior to the point in which they actually render the well incapable of production by utilizing our method and product(s) on a regular maintenance schedule to remove unwanted fluids in the wellbore in an effort to maintain stable and predictable production in said wells and to increase profits for the operators of said wells.

Other objects and advantages of this invention will become more fully apparent as this description proceeds, reference being made to the accompanying drawings and appended claims.

BRIEF DESCRIPTION OF DRAWINGS

Referring to FIG. 1, a typical producing well 10 located at a well site 11 includes a bore hole 12 drilled into the earth 14 to penetrate a zone 16 which is productive of oil or gas. A string of casing 18 is placed in the bore hole 12 and cemented therein by a sheath 22 of cement. A perforating gun (not shown) has been lowered inside the casing and energized to form a plurality of perforations 24 providing communication between the inside of the casing string 18 and the productive formation. 16. A packer 26 and tubing string 28 have been lowered into the well 10 and manipulated to set the packer 26 to provide a seal between the tubing string 28 and the casing string 18. The tubing string 28 has been swabbed to bring the well in and allow the hydrocarbon fluids in the formation 16 to flow into the bottom of the well 10, up the tubing string and out of the Christmas tree 30. As will be evident to those skilled in the art, the Christmas tree 30 comprises a head or lower section 32 providing slips for suspending the tubing string 28 in the well 10 and a sealing mechanism to seal the annulus between the tubing string 28 and the casing 18. Above the head 32 is a lower master valve 34 which is connected by a short conduit 36 to an upper master valve 38. On top of the upper master valve 38 is a tee 40 having a tapped bull plug 42 having a gauge 44 screwed therein. A wing valve 46 is connected into another of the ports of the tee 40 and is typically connected to a choke cage as will be evident to those skilled in the art. It will be seen that the well 10 is a typical well productive of oil or gas.

Figure 1:
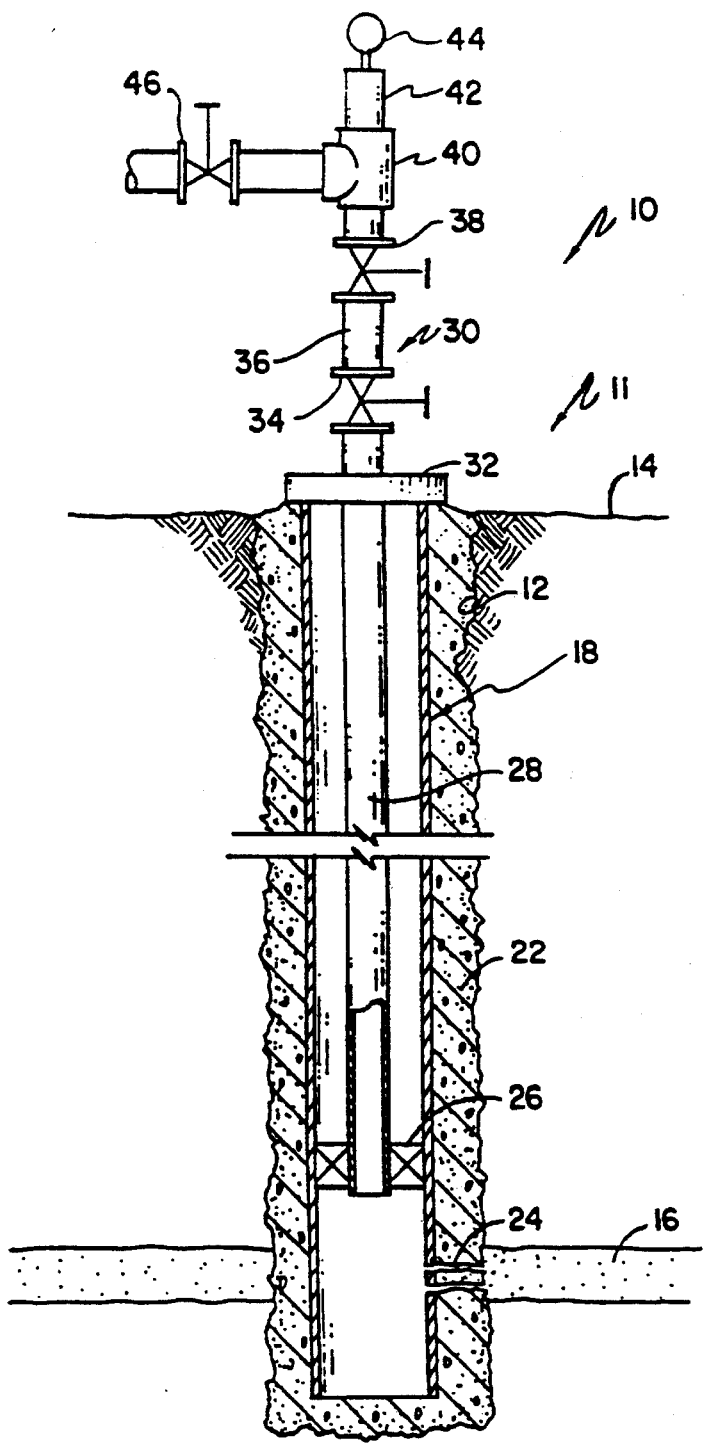
FIG. 1 is a longitudinal cross-sectional view of a typical well.
Figure 2:
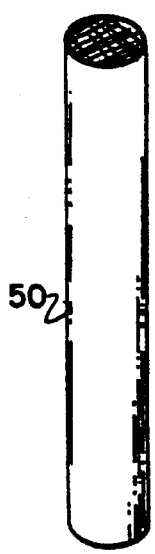
FIG. 2 is an exploded isometric view of the carder of this invention.

The well site 11 will be recognizable to those skilled in the art. In the case of an offshore well, the well site 11 is the platform and its attached assemblages. In the case of an onshore well, the well site 11 is typically recognizable as the cleared and trafficked area near the well 10.

In order to drop the carder 50 into the well 10, the upper and lower master valve 38, 34 are closed and the bull plug 42 is removed. The carder 50 is dropped into the Christmas tree 30 and the upper master valve 38 is opened. The carder 50 accordingly falls on top of the lower master vane 34. The upper master vane 38 is dosed and the lower master valve 34 is opened. The carder 50 accordingly falls by gravity through the tubing string 28 into the well 10. The lower master valve 34 is dosed and bull plug 42 is replaced. After a sufficient length of time elapses for the carder 50 the standing column of undesired fluids, and for the fluids to disintegrate the carrier 50, the well 10 is placed back on production. Note: the aforementioned procedure is necessary when the well is still capable of flow and treatment is undertaken to increase said production. If the procedure is undertaken to initiate flow in a dead well with no pressures, the master vane 34 is closed and the bull plug 42 is removed, master vane 34 is then opened to allow any pressure to bleed off and then carder 50 is dropped down tubing 28.

DETAILED DESCRIPTION OF INVENTION

It is an object of the present new invention to provide an improved and economical technique and product(s) capable of activating the aforementioned drowned wells. We achieve this result with a combination of surfactants and gas generating chemicals manufactured in such a manner to create a cylinder shaped solid stick with the surfactants and gas generating chemicals uniformly mixed and comingled together in the manufacturing process. The result being a product which creates foam instantly when coming into contact with water. The benefit being, to take a well which is drowned and temporarily incapable of flow, with a minimum quantity of gas migration through the column of fluid (less than is necessary to produce foam with a normal, non gas generating soap stick), drop our sticks down the I.D. of the production tubing and upon contact with the standing column of fluid -transform water into foam with no help from the well whatsoever. Thus, lightening the column weight of the undesired fluids and allowing the bottom hole pressure to move the column of transformed fluid from the wellbore and allowing the well to return to commercial production of hydrocarbons. By comingling the gas generating chemical uniformly with the surfactant mixture in the manufacturing process, the violent chemical reaction which takes place when coming in contact with the well fluids instantly creates large quantities of foam. This is achieved because the surfactants and the gas generating chemical comes into contact with the water at precisely the same time and when the chemical reaction takes place as the chemical reacts with the water the surfactant is standing by at the same instant to create the desired foaming effect. This fact makes the uniform comingling of the two ingredients during the manufacturing process paramount to the enhanced effectiveness of our technique and products over other methods previously encountered by the industry.

In addition, it creates foam so quickly, that the buoyancy effect on the stick as the force of gravity passes our sticks downward through the column of fluid is offset to a substantial degree by the speed of the transformation of water to foam—we are capable of instantly upon contact transforming the fluids to foam (foam doesn't provide as much buoyancy as the fluid), this feature aids in the effectiveness of our invention. The faster the column is transformed to foam, the faster the column can potentially move up the wellbore and out of the hole, thus, curing the problem of the well being drowned and incapable of flow. The principle is similar to when trying to push a heavy object such as an automobile, the first several feet are the hardest and then you have the forward momentum of the weight to help you in your efforts. The column of downhole fluids is much the same—once you can get the column moving, the easier it is to maintain the movement out of the wellbore. The faster we can transform the fluids to foam the faster and easier we can move them out of the wellbore. The new approach of our invention is made possible by the use of surfactants with little or virtually no water being present in the surfactant blend to react with the gas producing chemicals during the manufacturing process. This is achieved by way of a multiple step process. First we can start with a surfactant which has a low concentration of water as the base material for the surfactant, second, we can mechanically remove as much water as is possible and finally we can chemically treat out as much of the water in the surfactant as possible. This is a highly technical undertaking and the technology is fairly new. We utilize this process in our technique but do not rely on the specifics thereof in the claims of our invention. We use the technology in conjunction with several other novel and unique principles in our claims. There are a number of blends of surfactants suitable for our process—the key to the choice of surfactant is minute amounts of water and choosing roamers which are suitable, effective foaming agents for the mineral and chemical makeup of the downhole fluids we are attempting to transform to foam.

We have used an number of gas generating chemicals in our development, all of which effective in the aforementioned product(s) and technique. The most successful were the chemicals which produced the most volumes of gas per pound of chemical. The alkali metal hydride family of chemicals have proven the most effective, specifically sodium boro hydride. Although this is true, any and all chemicals capable of instantly generating large volumes of gas when coming into contact with fluids have proven effective in our process. There have been prior attempts at dealing with the same problem (drowned wells) one of which utilizes the same combination of products (hydrides and surfactants, U.S. Pat. No. 3,164,206), but there is a major difference in the product, claims and most of all the effectiveness. The product in the aforementioned prior patent relies on the surfactant in solid form as ours, but he places the gas producing chemical in a cavity in the middle of the surfactant stick. We comingle the gas producing chemical uniformly throughout the stick. The prior invention must fall through the well fluids being dissolved but without reacting and generating gas until the outer layer of surfactant is melted away and at that point where the surfactant in gone the gas producing chemical will contact the well fluids and react in one violent burst. Because of the gas rising from that point the prior invention will only be effective at making foam from that point of burst upward. Due to the potentially extreme temperatures encountered in the wellbore this process may only reach 20–50 feet of what could be a 2000 foot column of fluid. Our process, on the other hand, is generating gas from the point of initial contact with the well fluids, transforming water into foam instantly as the force of gravity moves it down the wellbore. We are moving down the wellbore making foam as we go, the prior invention makes foam in one burst at an arbitrary position in of the hole which is undeterminable. With our method, we can calculate how many sticks it takes to transform so many feet of fluid and or barrels of fluid into foam to achieve our end result of reviving the dead well, the prior invention cannot calculate the amount of water it can transform to foam because of the uncertainty of when the "bomb" will go off or where it will go off in the wellbore. We feel that our technique and product(s) are substantially different both in design and effectiveness for these reasons.

We can achieve this end result for an average cost of approximately one hundred dollars per well, per treatment— drastically less than any current alternative to the problem. We have had great success utilizing this process in actual field applications in south Texas for major oil companies. We have been tested for our effectiveness and in the wells we were unsuccessful at restoring flow, swabbing was attempted and the swabber was incapable of restoring commercial flow to any of the wells we unsuccessfully treated— we are a direct alternative to swabbing at 10%–25% of the cost of the swabbing operation.

Although the invention has been described in its preferred forms with a certain degree of detail, it is understood that the present disclosure is only by way of example and numerous changes in the details of construction and in the combination and arrangement of ingredients may be resorted to without departing from the spirit and scope of the invention as hereinafter claimed.

The invention having been described; I claim:

1. A method of reviving an oil or natural gas well having a fluid column therein using a hydrogen gas producing, self reacting, self agitating, solid foam stick comprising the steps of:

(a) Melting a solid foamer or combinations of foamers and solid surfactant or combinations of surfactants with heat into liquid form and combining and mixing uniformly with a hydrogen gas generating chemical or combinations of hydrogen gas generating chemicals, an acid or combination of acids, and an weighing agent or combinations of weighing agents and allowed to cool and solidify into solid stick;

(b) Dropping said solid stick down the well allowing reacting with the fluid column and frothing or foaming said column to reduce the hydrostatic pressure and the surface tension of said fluid column;

(c) producing the foaming fluid column to the surface.

2. The method of claim 1, wherein the foam stick comprising less than 3% moisture.

3. The method of claim 1, wherein, the gas generating chemical producing hydrogen gas upon contacting said fluid column.

4. The method of claim 1, wherein the gas generating chemical comprising alkali metal hydrides.

5. The method of claim 1, wherein the gas generating chemical comprising alkaline earth metal hydrides.

6. The method of claim 1, wherein the gas generating chemical comprising sodium borohydride.

7. The method of claim 1 further comprising the step of altering the PH of said fluid column to accelerate the reaction of said gas producing chemical when said stick contact said fluid column.

* * * * *